Feb. 10, 1925.
R. E. SAYLOR
ANTISKID DEVICE
Filed July 29, 1924
1,526,240
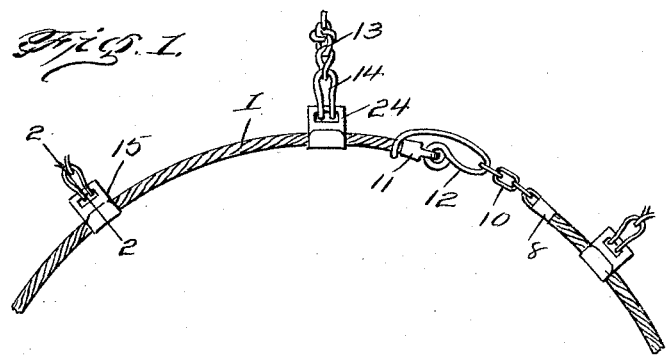
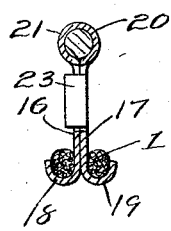
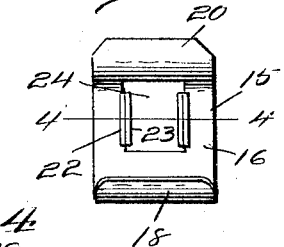
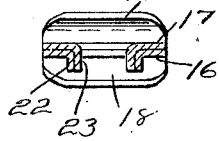
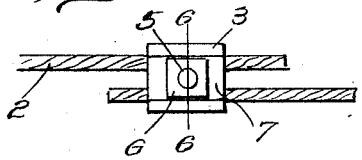
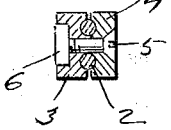
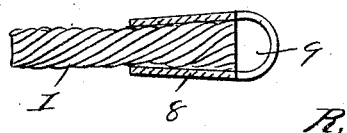
Inventor
R. E. Saylor
By Clarence A. O'Brien
Attorney Patented Feb. 10, 1925.

1,526,240

UNITED STATES PATENT OFFICE.

ROBERT E. SAYLOR, OF SALEM, NEBRASKA.

ANTISKID DEVICE.

Application filed July 29, 1924. Serial No. 728,902.

*To all whom it may concern:*

Be it known that I, ROBERT E. SAYLOR, a citizen of the United States, residing at Salem, in the county of Richardson and State of Nebraska, have invented certain new and useful Improvements in an Antiskid Device, of which the following is a specification.

This invention relates to an anti-skid device, and has for its principal object to provide a means for use in connection with the pneumatic tires of the wheels of a motor vehicle for preventing the skidding of the wheels on a wet, slippery or muddy surface.

Another important object of the invention is to provide an anti-skid device of the abovementioned character, wherein means is provided for adjusting and securing the anti-skid device in proper position on the vehicle wheel whereby the movement of the anti-skid device on the wheel is prevented.

A further object of the invention is to provide an anti-skid device of the abovementioned character, which is simple in construction, inexpensive, strong and durable and furthermore adapted for the purposes for which it is designated.

Other objects and advantages of this in invention will become apparent during the course of the following description.

In the accompanying drawing forming a part of this specification and in which like numerals designate like parts throughout the same:

Figure 1 is a side elevation of a portion of the inside cable, showing the means for securing the free ends thereof together and the cross chain supporting lugs carried thereby.

Figure 2 is a sectional view taken approximately on line 2—2 of Figure 1, with the cross chains detached therefrom.

Figure 3 is a side elevation of one of the lugs forming a part of the present invention.

Figure 4 is a sectional view taken approximately on line 4—4 of Figure 3.

Figure 5 is a detail side elevation of the fastening means for the free ends of the outside cable.

Figure 6 is a sectional view taken approximately on line 6—6 of Figure 5.

Figure 7 is a detail view of the securing means associated with one of the free ends of the inside cable for receiving the locking hook.

In the drawing, wherein for the purpose of illustration is shown the preferred embodiment of my invention, the numerals 1 and 2 designate a pair of parallel side cables which are adapted to extend circumferentially around the pneumatic tire of a vehicle wheel in the manner well known in the art. The cable 1 is designated as the inside cable and is adapted to extend around the inner side of the tire while the cable 2 is adapted to extend around the outer side of the tire and is designated as the outside cable. The free ends of the outside cable 2 are secured together by means of the complementary blocks 3 and 4 respectively and the fastening bolts 5 which extend through the blocks and have the nuts 6 threaded on the threaded ends thereof. The block 3 is provided in its outer face with a channel 7 for receiving the nut 6 and for further preventing the rotation of the nut when the same is in position on the threaded end of the bolt 5. The manner in which the free ends of the outside cables 2 are secured is clearly illustrated in Figure 6 of the drawing.

One of the free ends of the inside cable 1 has secured thereon the tapered cap 8 and the outer end thereof provides an eye or loop 9, the purpose of which will hereinafter be more fully described. Secured to the eye portion 9 of the cap 8 is a short section of a chain 10. The other free end of the inside cable 1 has secured thereto a cap 11 of the construction identical with the cap above described and the same is also provided with an eye portion similar to the eye portion 9. Secured to the eye portion of the cap 11 is the curved hook 12, the free end thereof being adapted to extend through one of the links of the chain 10 and then further into engagement with the free end of the cable on which the cap 11 is secured in the manner clearly illustrated in Figure 1. This construction enables the inside cable 1 to be adjusted to the proper size with respect to the vehicle wheel on which the same is placed and the clamping members 3 and 4 will permit adjustment of the outside cable 2 for the same purposes. The provision of the chain 10 and the hook or lever 12 furthermore provides a means for taking up the slack of the side cables when the anti-skid device is in position on the vehicle wheel.

Adapted to extend transversely between the parallel side cables 1 and 2 at spaced intervals and further adapted to extend over the tread portion of the pneumatic tire are cross chains 13. A hook such as is shown at 14 is provided on the respective ends of each of the cross chains. For the purpose of securing the cross chains in proper position to the side cables at spaced intervals, I provide hook engaging lugs 15 which are carried by each of the side cables and arranged at spaced intervals thereon and are further adapted to cooperate at diametrically opposite points for receiving the hooks formed on the respective ends of each of the chains.

Each of the lugs 15 comprises a sheet metal blank which is bent back upon itself intermediate its ends to provide the plates 16 and 17 respectively. The free ends of the plates are curled upwardly in opposite directions as illustrated at 18 and 19 respectively and the purpose of this construction is to provide clips for engagement with strands of each of the cables, it being understood of course that each side cable has the strands thereof divided or separated at spaced intervals to permit the clips to extend therethrough whereby the lugs will be permanently carried by the cables in the manner clearly illustrated in Figure 2 of the drawing. Each lug will extend upwardly from the cable and the upper portion of each lug is looped as illustrated at 20 and for the purpose of retaining the looped shape of the upper end of each lug, a pin 21 extends transversely through the looped portion in the manner also clearly illustrated in Figure 2.

Struck out from the plates 16 and 17 and disposed laterally therefrom are the ears 22 and 23 respectively. The ears 23 of the plates 17 abut the ears 22 of the plate 16 in the manner clearly illustrated in Figure 4 of the drawing and the purpose of this construction is to provide an enlarged opening 24 in each of the lugs 15 directly below the looped upper portion 20 for receiving the hooks 14 provided on the respective ends of each of the cross chains 13.

Each pair of diametrically arranged lugs on the parallel side cables 1 and 2 respectively will extend upwardly therefrom and will enable the cross chains 13 to have the hooks on the ends thereof detachably engaging the openings provided in the lugs whereby the cross chains may be secured in proper position over the tread portion of the pneumatic tire and subjected to the parallel side cables. The lugs may be constructed of any suitable material such as pressed steel although any other suitable material may be substituted therefor, and I do not wish to limit myself to the particular kind of material to be used.

It will thus be seen from the foregoing description, that an anti-skid device for use upon pneumatic tires of vehicle wheels has been provided which may be readily and easily adjusted to take up the slack of the same when in position on the vehicle wheel and furthermore the same is of such a construction as to enable the device to be readily and easily applied or removed from the wheel. The lugs will furthermore be prevented from becoming accidentally disengaged from the side cable and should the cross chains become worn as to be of no further use, the same may be readily detached and replaced by new ones. This will save considerable expense as well as obviate the necessity of having to purchase an entirely new anti-skid device, as must frequently be done with the anti-skid chains now universally in use.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In an anti-skid device of the class described, a lug for attaching one free end of a cross chain to a cooperating side cable, said lugs comprising a single metal stamping bent between its ends to provide opposed plate like portions in contact with each other, the free outer end of said portion being curled in opposite directions to form clips for engagement with strands of the aforesaid side cable, the bight portion of said stamping being bent into tubular form, a pin fitting snugly in said tubular portion, the plate like portions between said tubular portion and said clips being struck out to provide an opening, and the struck out portion being bent laterally from the opening to form reinforcing means.

In testimony whereof I affix my signature.

ROBERT E. SAYLOR.